United States Patent Office 3,333,868
Patented Aug. 1, 1967

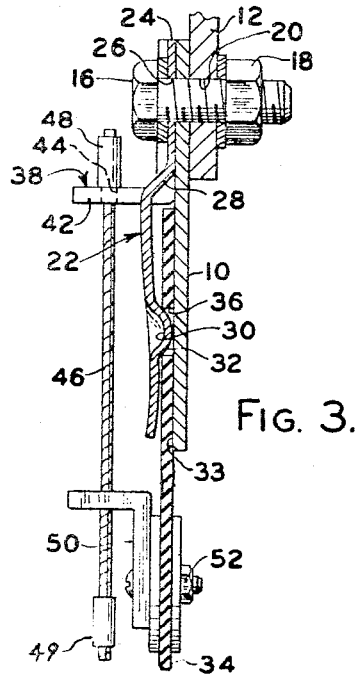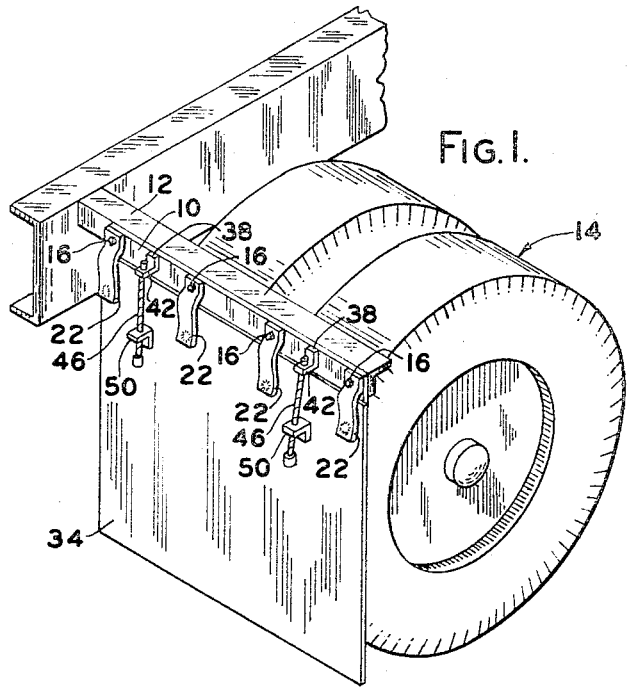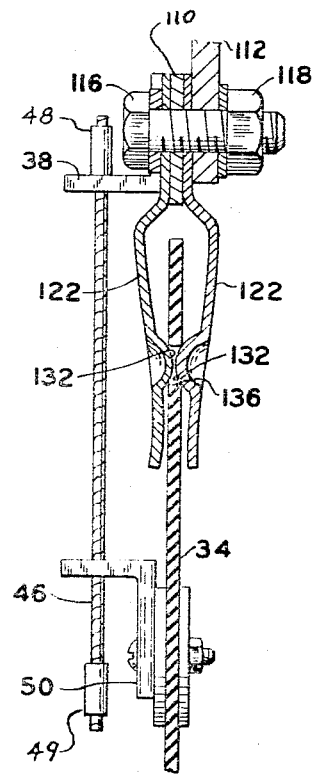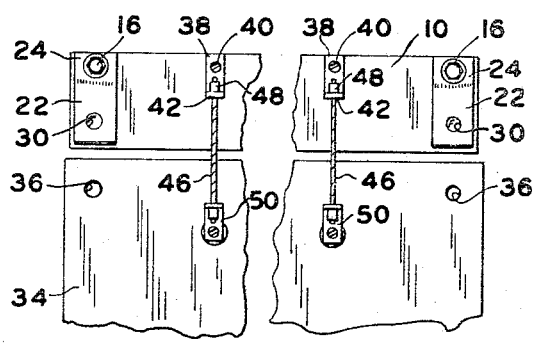

3,333,868
MUD FLAP SUPPORT
Nash P. Sogoian, 1417 21st St., Detroit, Mich. 48216
Filed Apr. 30, 1965, Ser. No. 452,322
4 Claims. (Cl. 280—154.5)

The present invention relates to supports for vehicular mud flaps and more particularly to such a support having means permitting detachment of the mud flap from the support means without damage to the mud flap if the mud flap comes into contact with an obstruction and means maintaining a loose but secure connection between the support and the mud flap so that upon detachment the mud flap cannot become lost.

Mud flaps for vehicles such as trucks or the like are often torn from their supports as the trucks are backed into loading or unloading position and the mud flaps come into engagement with obstructions such as the loading docks.

My co-pending application, Ser. No. 243,260 filed Dec. 10, 1962, and now Patent No. 3,224,791, provides one solution to this problem in the form of a support member which is resiliently mounted to the vehicle and which is provided with a resilient joint intermediate the ends of the support member. In this way when obstructions are encountered the support member deflects tending to diminish damage to both the mud flap and the support member.

While the support member of my co-pending application has been found to offer considerable improvement over heretofore known support members for vehicular mud flaps it has been found that in some instances the mud flap will still be torn loose from the support member and will be damaged to such an extent that it will be necessary to provide a replacement or it will become lost so that it will have to be replaced.

The present invention provides a new support member for vehicular mud flaps which can be mounted directly to the vehicle or which can be used in combination with my heretofore disclosed support member. The new support member is provided with means resiliently supporting the mud flap and operable to release the mud flap when an obstruction is encountered which would otherwise tear or damage the mud flap. To prevent the detached mud flap from becoming lost means are provided for securing the detached mud flap to the support member.

It is an object then of the present invention to increase the life of mud flaps for vehicles by providing a support member and means attaching the mud flap to the support member which are operable to release the mud flap upon an obstruction being encountered.

It is another object of the present invention to prevent the loss of vehicular mud flaps by providing a first means attaching the mud flap to a support and a second means maintaining attachment when the mud flap is detached from the support member through the first attaching means.

Still further objects and advantages will readily occur to one skilled in the art to which the invention pertains upon reference to the following drawings in which like reference characters refer to like parts throughout the several views and in which, FIG. 1 is a perspective view of a mud flap assembly of the present invention, FIG. 2 is an enlarged fragmentary elevational view illustrating the mud flap detached from the support member of the present invention, FIG. 3 is a lateral cross-sectional view of the embodiment shown in FIGS. 1 and 2 enlarged somewhat for purposes of clarity and illustrating the mud flap in the attached position, and FIG. 4 is a view similar to FIG. 3 but illustrating another preferred support member of the invention.

Now referring to the drawings for a more detailed description of the present invention, FIGS. 1–3 illustrate a mud flap support member 10 of the present invention as being secured to a horizontal support 12 as shown in FIG. 1 which is secured to or is a part of a vehicle such as a truck or the like. The support member 10 is mounted in a horizontal position behind the wheels 14 of the truck and to the support 12 by a plurality of bolts 16 and nuts 18.

The support member 10 preferably comprises an elongated flat bar having a plurality of longitudinally spaced preforations 20 provided near the upper edge. Several of the perforations 20 provide the means in combination with the bolts 16 and nuts 18 for attaching spring clips 22 to the support member 10. The spring clips 22 as can best be seen in FIG. 3 each preferably comprises an upper flat portion 24 provided with a hole 26 for receiving the bolts 16 and an S-shaped portion 28 extending downwardly from the flat portion 24. A central substantially circular depression 30 is formed in the outer surface of the S-shaped portion 28 to form a projection 32 on the opposite surface which when the bolts 16 and nuts 18 are tightened is brought into engagement with the adjacent surface 33 of the support member 10.

The spring clips 22 are constructed of a resilient material and provide in combination with the surface a first means for attaching a mud flap 34 to the support member 10. The mud flap 34 is provided with a plurality of holes 36 adjacent its upper edge spaced to coincide with several of the perforations 20 provided in the support member 10. As can best be seen in FIG. 3 the mud flap 34 is positioned intermediate the inner surface of the S-shaped portion 28 of the spring clips 22 and the adjacent surface of the support member 10 with the projections 32 disposed within the holes 36. The bolts 16 and nuts 18 are then tightened to attach the support member 10 to the support 12 and to resiliently urge the projection 32 against the surface 33 of the support member 10 to attach the mud flap 34 in position.

A second means of attaching the mud flap 34 to the support member 10 is also provided and preferably comprises a plurality of L-shaped bracket members 38 each mounted to the support member 10 in a position intermediate a pair of the spring clips 22 by a screw and nut 40 extending through one of the perforations 20. The bracket members 38 are each provided with an outwardly extending leg 42 provided with a hole 44. A cable 46 extends through the hole 44 and is provided at one end with an enlarged portion 48 which prevents detachment of the cable 46 from the leg 42 and has the opposite end secured to the mud flap 34 by means of an enlarged portion 49 and a bracket 50 similar to the bracket member 38 and a screw and nut member 52. The cables 46 are sufficiently long to permit considerable separation of the mud flap 34 and the support member 10 as can best be seen in FIG. 2.

The mud flap is normally mounted in the position illustrated in FIGS. 1 and 3. That is the mud flap 34 is normally attached to the support member 10 by both attaching means and is maintained in position by the first attaching means comprising the spring clips 22. When an obstruction is encountered which would normally tear the mud flap 34 loose from its supported position and would normally cause damage to either the mud flap, the support member or both, the mud flap 34 will be separated from the spring slips 22. The spring clips 22 are sufficiently resilient to permit this separation without damage to the mud flap 34. With the mud flaps 34 thus detached from the spring clips 22 it cannot become lost because the cables 46 still securely attach the mud flap 34 to the support member 10 as shown in FIG. 2. The cables 46 are sufficiently long to permit considerable separation of the mud flap 34 and the support member 10 so that the danger of the mud flap 34 being torn loose from the cables 46 is quite remote.

FIG. 4 discloses another preferred embodiment of the present invention similar to the embodiment described above but in which a pair of spring clips 122 are mounted on opposite surfaces of a support member 110 by bolts and nuts 116 and 118 respectively. The spring clips 122 are similar to those described above and are secured to the support member 110 in a position such that the projections 132 are resiliently urged into engagement. The mud flap 34 is provided with upper holes 136 which receive a pair of projections 132 so that by providing a number of pairs of spring clips 122 the mud flap 34 is mounted to the support member 110 substantially in the manner described above. Cables 46 and brackets 38 and 50 are also fixed to the support member 110 and the mud flap 34 to provide the second attaching means as described above.

It is apparent that the present invention provides a mud flap assembly in which there is very little danger of the mud flap becoming damaged or lost. Further, when the attaching means of the present invention is used in combination with the support member of my aforementioned co-pending application a mud flap assembly is provided which represents considerable improvement over heretofore known mud flap assemblies.

It is also apparent that although I have described but several embodiments of my invention many changes and modifications can be made therein without departing from the spirit of the invention as expressed by the appended claims.

I claim:
1. A mud flap assembly for vehicles such as trucks or the like comprising
    (a) a support member and a mud flap,
    (b) a plurality of clip members carried by said support member and each of said clip members being provided with an S-shaped portion adapted to be resiliently brought into engagement with said support member,
    (c) a projection being provided on said S-shaped portions on the surface of said clip members adjacent said support member,
    (d) said mud flap being provided with perforations adapted to receive said projections when said mud flap is inserted intermediate said clip members and said support member, and
    (e) an elongated flexible member carried by said support member and secured to said mud flap to prevent separation of said support member and said mud flap when said mud flap is removed from said clip members.
2. A mud flap assembly for vehicles such as trucks or the like comprising
    (a) a support member and a mud flap,
    (b) a plurality of clip members carried by said support member and including S-shaped portions adapted for resilient engagement with said support member,
    (c) a projection provided on each of said clip members and said mud flap being provided with perforations adapted to receive said projections when said mud flap is inserted intermediate said clip members and said support members.
    (d) an elongated flexible member carried by said support member and secured to said mud flap to prevent separation of said support member and said mud flap when said mud flap is disengaged from said clip members, and
    (e) bracket members carried on said support member and on said mud flap, said bracket members each being provided with a through hole, and the ends of said flexible member extending through said holes and being enlarged to prevent said flexible member from separating from said brackets.
3. A mud flap assembly for vehicles such as trucks or the like comprising,
    (a) a support member and a mud flap,
    (b) a plurality of clip members carried by said support member and means urging said clip members into supporting and mounting engagement with said mud flap,
    (c) an elongated flexible member carried by said support member and secured to said mud flap to prevent separation of said support member and said mud flap when said mud flap is removed from said clip members, and
    (d) bracket members carried on said support member and said mud flap, said brackets each being provided with a through hole, the ends of said flexible member extending through said holes and being enlarged to prevent said flexible member from separating from said brackets.
4. A mud flap assembly for vehicles such as trucks or the like comprising,
    (a) a support member and a mud flap,
    (b) a plurality of clip members carried by said support member and means urging said clip members into supporting and mounting engagement with said mud flap,
    (c) said clip members being mounted to said support member in pairs and each comprising an S-shaped portion, a projection provided on said S-shaped portions with said projections of each pair of clip members being in resilient engagement,
    (d) said mud flap being provided with perforations adapted to receive said engaging projections when said mud flap is inserted intermediate said pairs of clip members, and
    (e) an elongated flexible member carried by said support member and secured to said mud flap to prevent separation of said support member and said mud flap when said mud flap is disengaged from said members.

References Cited
UNITED STATES PATENTS 3,219,363    11/1965    Dalsey et al.    280—154.5
3,248,126    4/1966    Saxton et al.    280—154.5

BENJAMIN HERSH, *Primary Examiner.*

M. S. SALES, L. D. MORRIS, *Assistant Examiners.*